US012380648B2

(12) United States Patent
Urella

(10) Patent No.: US 12,380,648 B2
(45) Date of Patent: Aug. 5, 2025

(54) CONFIDENCE SCORE FOR DEPTH MAP OR 3D MESH

(71) Applicant: STREEM, LLC, Portland, OR (US)

(72) Inventor: Nikilesh Urella, Portland, OR (US)

(73) Assignee: STREEM, LLC, Portland, OR (US)

( * ) Notice: Subject to any disclaimer, the term of this patent is extended or adjusted under 35 U.S.C. 154(b) by 285 days.

(21) Appl. No.: 17/960,704

(22) Filed: Oct. 5, 2022

(65) Prior Publication Data

US 2023/0290070 A1 Sep. 14, 2023

Related U.S. Application Data

(60) Provisional application No. 63/318,705, filed on Mar. 10, 2022.

(51) Int. Cl.
G06T 17/20 (2006.01)
G06T 7/50 (2017.01)
G06V 10/25 (2022.01)

(52) U.S. Cl.
CPC .............. *G06T 17/205* (2013.01); *G06T 7/50* (2017.01); *G06V 10/25* (2022.01); *G06T 2207/10024* (2013.01); *G06T 2207/10028* (2013.01); *G06T 2207/20164* (2013.01)

(58) Field of Classification Search
CPC .............. G06T 17/205; G06T 7/50; G06T 2207/10024; G06T 2207/10028; G06T 2207/20164; G06V 10/25
See application file for complete search history.

(56) References Cited

U.S. PATENT DOCUMENTS

| 2015/0049915 | A1* | 2/2015 | Ciurea | G06T 7/557 |
| | | | | 382/106 |
| 2017/0004649 | A1* | 1/2017 | Collet Romea | G06T 7/33 |
| 2017/0148168 | A1* | 5/2017 | Lindner | G06T 5/00 |
| 2018/0139436 | A1* | 5/2018 | Yücer | H04N 13/106 |
| 2021/0133996 | A1* | 5/2021 | Zhou | G06T 7/579 |
| 2021/0407189 | A1* | 12/2021 | Yamanaka | G06T 7/12 |

* cited by examiner

Primary Examiner — Terrell M Robinson
(74) Attorney, Agent, or Firm — Schwabe Williamson & Wyatt

(57) ABSTRACT

Embodiments of devices and techniques of obtaining a three dimensional (3D) representation of an area are disclosed. In one embodiment, a two dimensional (2D) frame is obtained of an array of pixels of the area. Also, a depth frame of the area is obtained. The depth frame includes an array of depth estimation values. Each of the depth estimation values in the array of depth estimation values corresponds to one or more corresponding pixels in the array of pixels. Furthermore, an array of confidence scores is generated. Each confidence score in the array of confidence scores corresponds to one or more corresponding depth estimation values in the array of depth estimation values. Each of the confidence scores in the array of confidence scores indicates a confidence level that the one or more corresponding depth estimation values in the array of depth estimation values is accurate.

20 Claims, 12 Drawing Sheets

| AAA | BBB | CCC | DDD |
|-----|-----|-----|-----|
| EEE | FFF | GGG | HHH |
| III | JJJ | KKK | LLL |

FIG. 6

CONFIDENCE SCORE FOR DEPTH MAP OR 3D MESH

PRIORITY CLAIM

This application claims the benefit of U.S. provisional patent application No. 63/318,705, filed Mar. 10, 2022, titled "Confidence Score for Depth Map/3D Mesh," and incorporated herein by reference.

BACKGROUND

Three dimensional (3D) meshes are often generated to model areas in the real world. However, obtaining accurate 3D meshes requires obtaining accurate depth measurements of the area. In indoor environments, planar regions (e.g., walls, corners, edges, untextured subareas) can affect depth measurements. Furthermore, depth measurements are also affected by fast movements of the device capturing images of the area. These inaccuracies can result in faulty artifacts and inaccurate 3D meshes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is an illustration of an array of confidence scores, in accordance with some embodiments.

DETAILED DESCRIPTION

Figure 1:
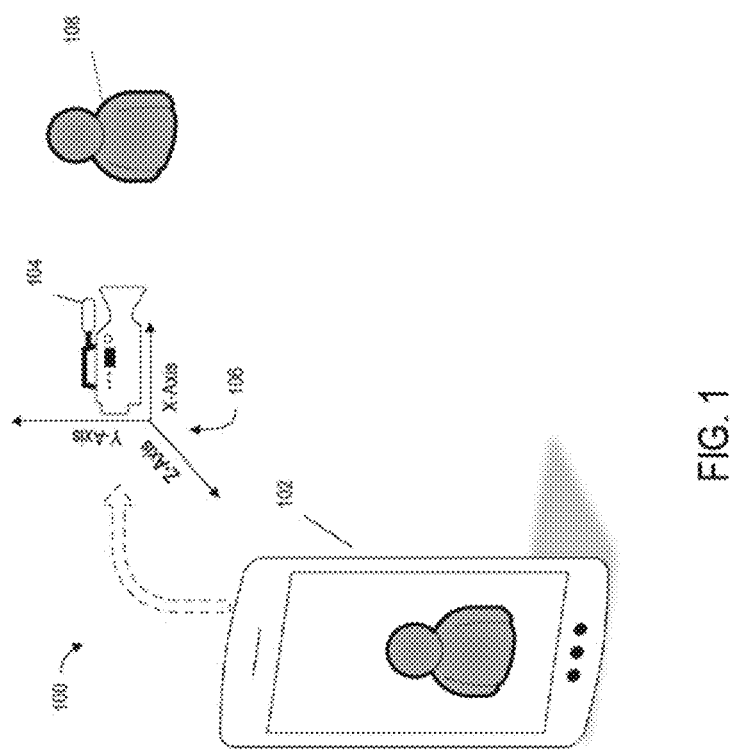
FIG. 1 illustrates an example system that may enable capture of an image or video that includes augmented reality (AR) data, in accordance with some embodiments.

In the following detailed description, reference is made to the accompanying drawings, which form a part hereof wherein like numerals designate like parts throughout, and in which are shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

Call-outs for components that are present in multiples may be numbered identically, with a letter suffix distinguishing each instance of the multiple component. For example, where a component 1 is present multiple times in a figure, each instance of component 1 may be designated 1$a$, 1$b$, 1$c$ ... 1$x$. Referring to a component by its call-out without the letter, e.g. component 1, should be understood to refer to any or all instances of component 1$a$-1$x$, while reference to a specific instance of a component 1 will include its letter, e.g. component 1$b$.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments of a computer device, methods, and non-transitory computer readable medium are disclosed. In some embodiments, a two dimensional (2D) frame of an array of pixels is obtained of the area. Furthermore, a depth sensitive device is used to obtain a depth frame of the area. An array of confidence scores is generated, wherein each of the confidence scores indicates a confidence level that the corresponding depth estimation value in the array of depth estimation values is accurate. In this manner, uncertainties and inconsistencies arising in depth predictions are identified. By identifying faulty sections with inaccurate depth estimation values, correction techniques are applied in order to generate more accurate three-dimensional (3D) meshes from the 2D frame and the depth frame.

FIG. 1 illustrates an example system 100 that may enable capture of an image or video that includes augmented reality (AR) data, in accordance with some embodiments.

System 100 may include a device 102. In the depicted embodiment of FIG. 1, device 102 is a smartphone, which may be implemented as a computer device 1500, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may include one or more three-dimensional objects 108.

Camera 104 may be any camera that can provide a suitable video stream for the intended purpose of device 102. Where device 102 is implemented as a smartphone or tablet, camera 104 may be one or more built-in cameras. In other embodiments, such as where consumer device is a laptop, camera 104 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and device 102. In other embodiments, such as where device 102 is equipped with multiple cameras or similar sensors, one or more of the sensors may be configured to directly detect depth points, such as a 3D camera, LIDAR, or other suitable depth-sensing technology.

Spatial position sensor 106 may be configured to provide positional information about the pose of camera 104, such as camera 104's rotation, pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera 104, including but not limited to spatial position sensors 106. In some embodiments, spatial position sensor 106 may include multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

Figure 2:
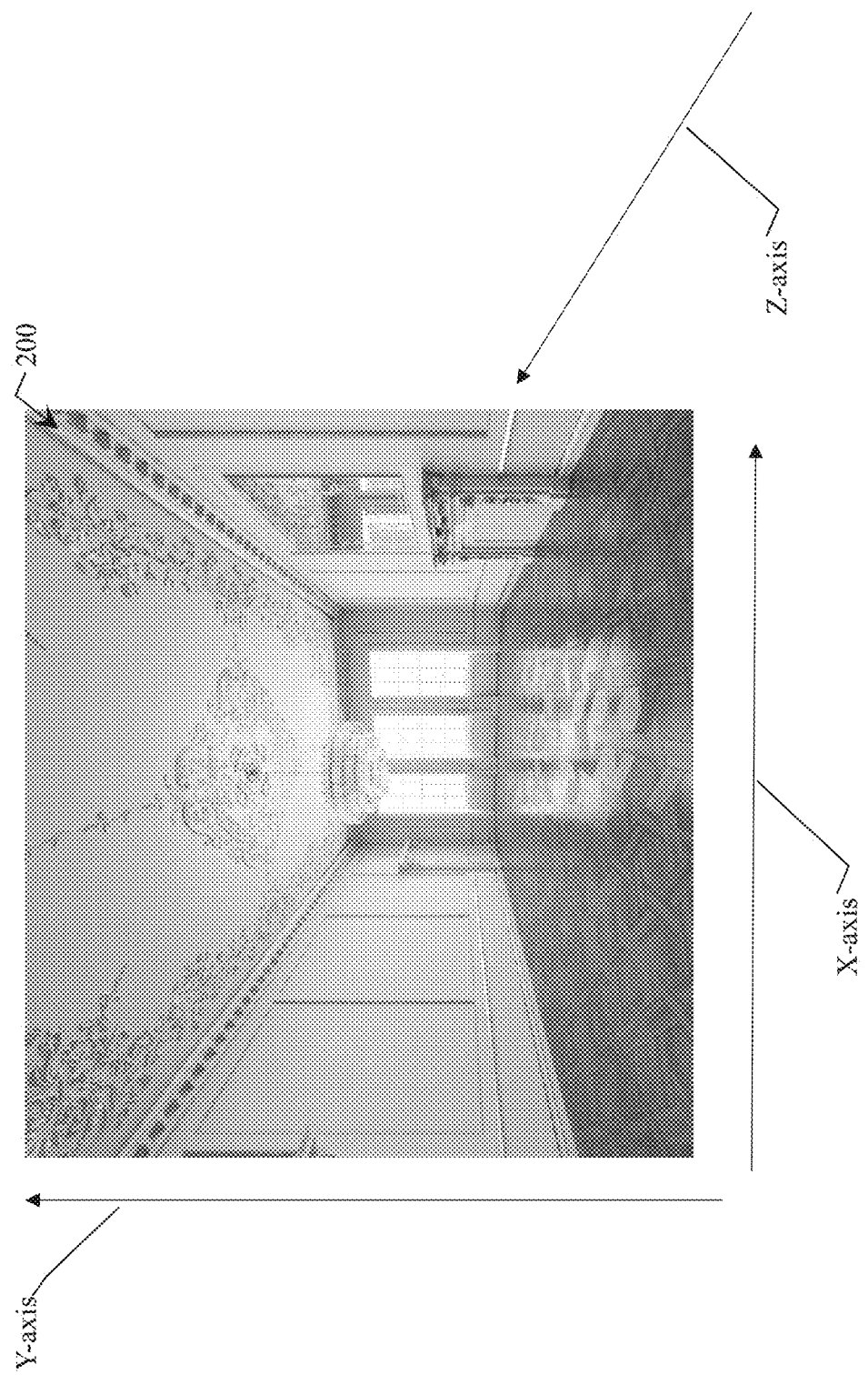
FIG. 2 is an illustration of an area, in accordance with some embodiments.

FIG. 2 is an illustration of an area 200, in accordance with some embodiments.

In some embodiments, the device 102 of FIG. 1 is obtaining a three dimensional (3D) representation of the area 200. In FIG. 2, the area 200 is an indoor area. In other embodiments, the area 200 is an outdoor area.

The device 102 is configured to scan the area 200 in order to generate a 3D mesh of the area 200, as explained in further detail below. The 3D mesh is a 3D structural computer model representing a physical region and/or object. The 3D mesh uses reference points, often referred to as vertices, that are used to define with the shape of an object/region. The vertices are connected to adjacent vertices by lines in order to represent boundaries of the object/region. In some embodiments, these vertices and lines form polygons.

The accuracy of the 3D mesh typically is dependent on the accuracy of depth maps. The device 102 typically obtains a two dimensional (2D) frame of the area 200. The 2D frame is generated to include an array of pixels. Each pixel represents color information at a position along an X-axis and a Y-axis that is orthogonal to the X-axis.

The device 102 obtains a depth frame of an area. In some embodiments, the device 102 scans the area 200 with a depth sensitive device (e.g., lidar) in order to generate a depth frame. Examples of depth sensitive devices include Lidar, a stereoscopic camera, radar, sonar, infrared sensors, and/or the like. In other embodiments, a depth frame is obtained using photogrammetric techniques which involves the comparison of frames of a given scene captured from different perspectives. The depth frame is an array of depth estimation values that estimate the position along a Z-axis that is orthogonal to both the X-axis and the Y-axis. Each depth estimation value estimates a depth of a different corresponding one or more of the pixels in the 2D frame. The device 102 is configured to generate a 3D mesh based on the 2D frame and the depth frame. The device 102 is configured to implement techniques that provide confidence scores for each of the depth estimation values. This allows for algorithms to be applied that increase the accuracy of subregions in the 2D frame that correspond to depth estimation values with low confidence scores.

Figure 3:
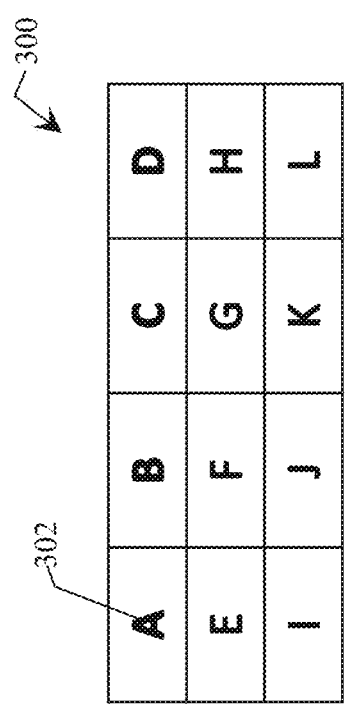
FIG. 3 is an illustration of 2D frame, in accordance with some embodiments.

FIG. 3 is an illustration of 2D frame 300, in accordance with some embodiments.

In FIG. 3, the 2D frame 300 is a computer model of an area, such as area 200 of FIG. 2. Each single letter is used to represent a pixel 302 with color information at a different position along the X-axis and the Y-axis of the area 200. Note that the single letter simply indicates that color information is being provided at each different position in the array. In some embodiments, color information is represented by a number. Note also that the 2D frame 300 has been simplified for the purposes of clarity and explanation.

Figure 4:
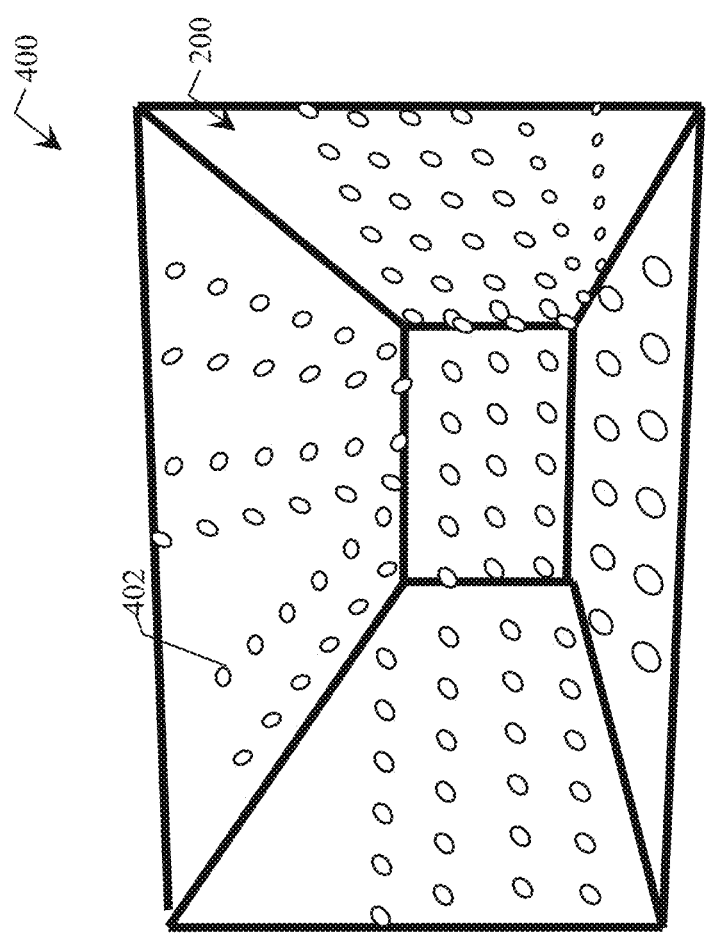
FIG. 4 is a visual illustration representing the area being scanned by a depth sensitive device to obtain depth estimation values, in accordance with some embodiments.

FIG. 4 is a visual illustration representing the area 200 being scanned by a depth sensitive device to obtain depth estimation values, in accordance with some embodiments.

In FIG. 4, a depth sensitive device in the device 102 is configured to obtain a depth estimation value at each of the locations 402 in the area 200.

In this embodiment, each of depth estimation values corresponds to a different pixel 302 of the 2D frame 300 in FIG. 3, which was captured of the area 200 in FIG. 2. In other embodiments, each of the depth estimation values corresponds to more than one of the different pixels 302 of the 2D frame 300 in FIG. 3

Figure 5:
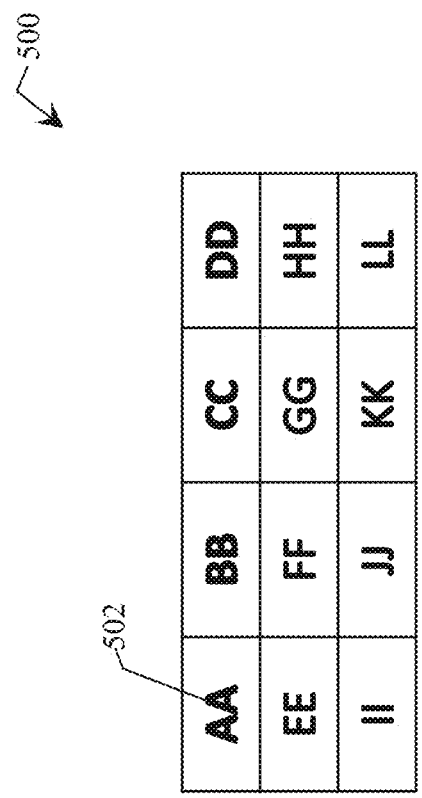
FIG. 5 is an illustration of a depth frame, in accordance with some embodiments.

FIG. 5 is an illustration of a depth frame 500, in accordance with some embodiments.

The depth frame 500 includes the depth estimation values 502 for measurements obtained with the depth sensitive device made at each location 402 of the area 200 shown in FIG. 4. In FIG. 5, each double letter is used to represent the depth estimation value 502 at a different position along the X-axis and the Y-axis of the area 200 and thus corresponds to one or more pixels 302 in the 2D frame 300. In other words, each depth estimation value 502 is an estimation of the position of a corresponding pixel 302 along the Z-axis. Note that the double letter simply indicates that a depth estimation value is being provided at each different position in the array. In some embodiments, the depth estimation value 502 is represented by a number. Note also that the depth frame 500 has been simplified for the purposes of clarity and explanation.

Figure 6:
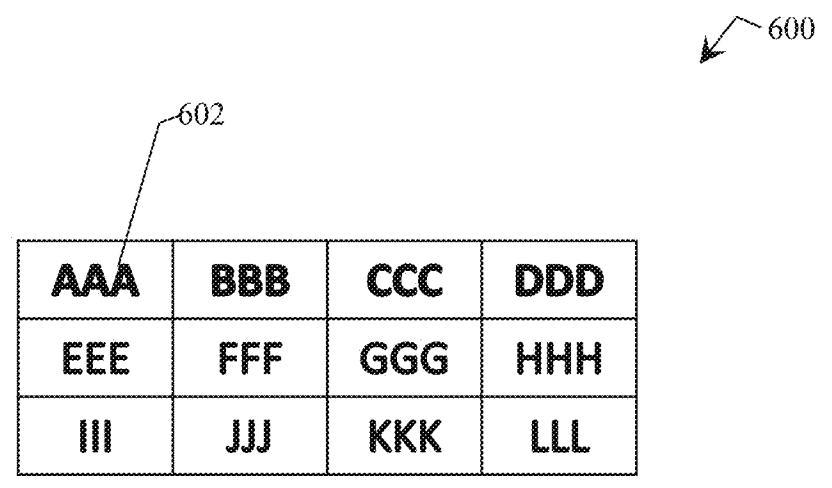

FIG. 6 is an illustration of an array 600 of confidence scores 602, in accordance with some embodiments.

Each confidence score 602 indicates a confidence level that the corresponding depth estimation value 502 in the depth frame 500 from FIG. 5 is accurate. Each triple letter is used to represent a confidence score 602 corresponding to a different depth estimation value 502 from FIG. 5. Note that the triple letter simply indicates that a confidence score is being provided at each different position in the array 600. In some embodiments, the confidence score 602 is represented by a number. Note also that the array 600 has been simplified for the purposes of clarity and explanation. In one example, the range for a confidence score value is between 0-1, with 0 being the lowest possible score and 1 being the highest. In some embodiments, neural network based approaches are used for estimation of depth maps from given two views. For an indoor space, these neural network based approaches tend to create inconsistent depth maps. Consider a case of a planar wall region with little or no texture variation. In some cases, a low confidence score is the result as depth estimation variations are quite large between two consecutive sets of images. This low confidence score can also happen for lidar based sensors when they are used for scanning windows (due to the glassy surfaces it produces inconsistent depth between consecutive frames). Regions which are well textured (in case of neural network based approaches), and regions which obey lidar's reflective properties (in case of lidar sensors) will provide consistent depth and high confidence score, in some embodiments.

When the depth sensitive device of the device 102 scans the area 200 to obtain the depth estimation values 502, different factors can affect the accuracy of the depth estimation value 502 obtained. Those factors include the linear and rotational speed of the device 102, untextured planar objects or subregions of the area 200, and the distance from the device 102. Fast motions, large untextured planar object/regions, and a large distance from the device 102 often results in less reliable depth estimation values 502.

Unreliable depth estimation values 502 often result in noisy artifacts in the resultant 3-D mesh. For example, inconsistencies in the depth predictions of consecutive 2-D frames can cause artifacts like floating blobs, non-planar geometric walls, and disconnected features and planes. In some embodiments, these erroneous artifacts are eliminated through filtering algorithms during the stages of the creation of the 3-D mesh if regions with depth estimation values 502 of low confidence can be identified before the 3-D mesh is integrated.

In some embodiments, one of the factors contributing to each of the confidence scores 602 is the magnitude of the depth estimation value 502, which is indicated as the depth distance ($D_d$). Thus, in some embodiments, the confidence score 602 is calculated with reference to the depth estimation value 502. The greater the magnitude of the depth estimation value 502, the lower the confidence score 602. In some embodiments, the depth distance ($D_d$) (i.e., the depth estimation value 502) is limited by a truncation distance $T_d$. In some depth map estimation approaches (e.g., neural network based algorithms and lidar sensors) the depth accuracy tends to decrease with greater depth. In some embodiments, if a user device is scanning a wall, it is measured as having a depth distance $D_d$ of 8 feet away, the depth estimation $D_d$ is poor. Accordingly, a truncation distance Ta of 6 feet is selected to filter out any depth distances that are measured greater than 6 feet.

In some embodiments, the confidence score 602 is based on the depth consistency ($D_c$) when the depth frame 500 is compared to a previous depth frame. In other words, the depth frame 500 is compared to a previous depth frame in time. For visible regions in the current and previous depth frame, depth consistency ($D_c$) is calculated when there is not much difference between a pixel's current depth estimation value 502 and a previous depth estimation value in time. In one embodiment, a pixel is identified as being in two different frames. The depth consistency $D_c$ is the difference in the depth estimation in the two different frames. If the difference in the depth estimation $D_d$ is small, then the depth consistency $D_c$ is higher than when the difference in the depth estimation $D_d$ is large. A threshold value is established so that the difference in the depth estimation $D_d$ is not larger than the threshold value. If the difference is the depth estimation $D_d$ is large, the lowest possible confidence score is given in some implementations.

In some embodiments, the confidence score 602 is based on a color variation score $T_v$. In some embodiments, a color variation score $T_v$ is aimed at identifying low confidence values for untextured regions. Untextured regions are identified when a region in the 2D frame 300 above a certain size is characterized by all of the pixels having color that are within a similarity threshold. The similarity threshold indicates how similar the color values have to be. In some embodiments, the color variation score $T_v$ denotes how many pixels in the current 2-D frame 300 are similar in color. In some embodiments, the color variation score $T_v$ indicates a variance from a mean. In other words, a mean color is calculated and then a variance from the mean color indicates the variation score $T_v$.

In some embodiments, the confidence score 602 is based on the depth distance ($D_d$), the depth consistency ($D_c$), the truncation distance ($T_d$), and the color variation score $T_v$. In some embodiments, a confidence score C may be calculated from these values using the following equation:

$$C=(1-D_d/T_d)*D_c*T_v$$

In some embodiments, confidence scores 602 for weakly scanned areas have low confidence values. This differentiation in the volume will provide flexibility to noisy surface improvement algorithms and planar smoothing algorithms. In some embodiments, a 3D volume is utilized to integrate multiple depth maps to create a 3D mesh representation of the physical space that is being scanned. If a few depth maps are inconsistent, the depth map will have a high percentage of depth estimations with low confidence scores. For example, if a few mesh regions of a big planar wall have low confidence scores, then those mesh regions can be modified and made planar with a fitted 3D plane guessed from the high confidence regions. Noisy surface improvement algorithms and planar smoothing algorithms are used to improve the 3D mesh. These algorithms can further improve the overall surface quality. In some embodiments, when at least one region of the 2-D frame 300 includes low confidence regions, processing cleanup algorithms are applied to clean up the regions. Low confidence regions are determined when a confidence score 602 or a group of confidence scores is below a threshold. The algorithms result in higher confidence scores 602 after the algorithm is applied to the 2D frame 300 and the depth frame 500.

Figure 7:
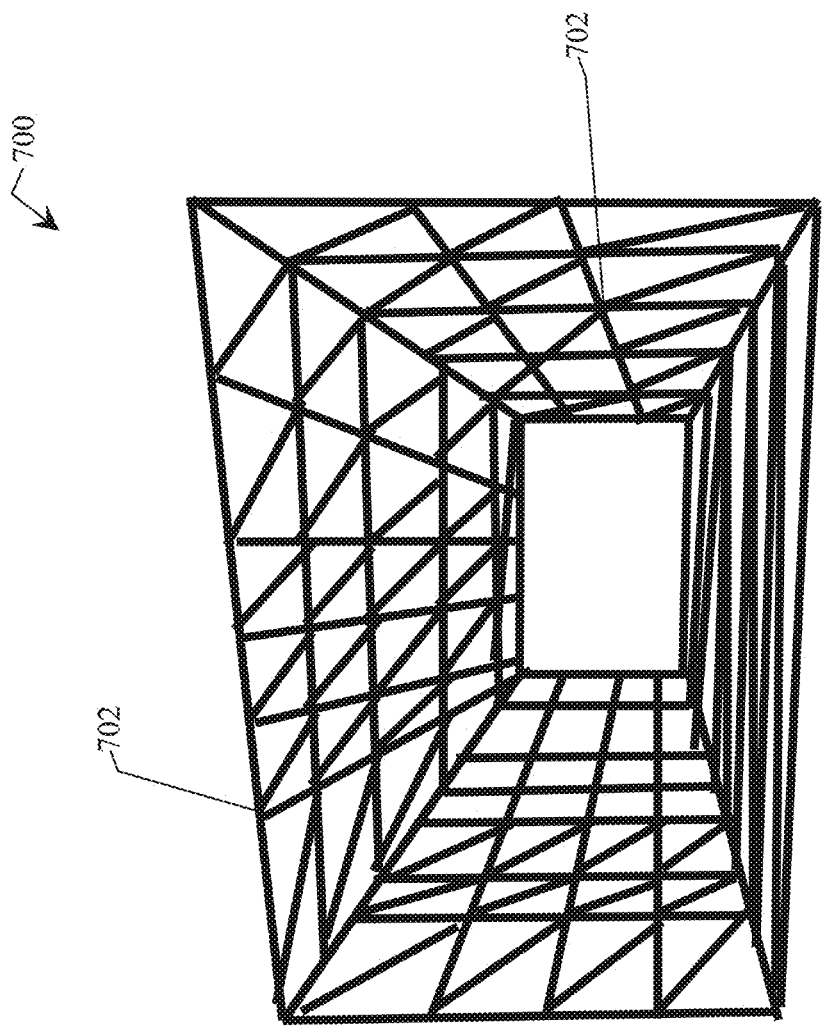
FIG. 7 is a visual representation of a 3-D mesh of the area, in accordance with some embodiments.

FIG. 7 is a visual representation of a 3-D mesh 700 of the area 200, in accordance with some embodiments.

The 3-D mesh 700 includes a 3-D mesh of 3-D vertices 702. Each 3-D vertex 702 corresponds to a location in the area 200 and to lines that connect the 3-D vertex 702 to other 3-D vertices in the 3-D mesh. The 3-D mesh 700 is generated based on the 2-D frame 300 and the depth frame 500. Each vertex 702 is also associated with color data describing a color at the location of the area 200.

Figure 8:
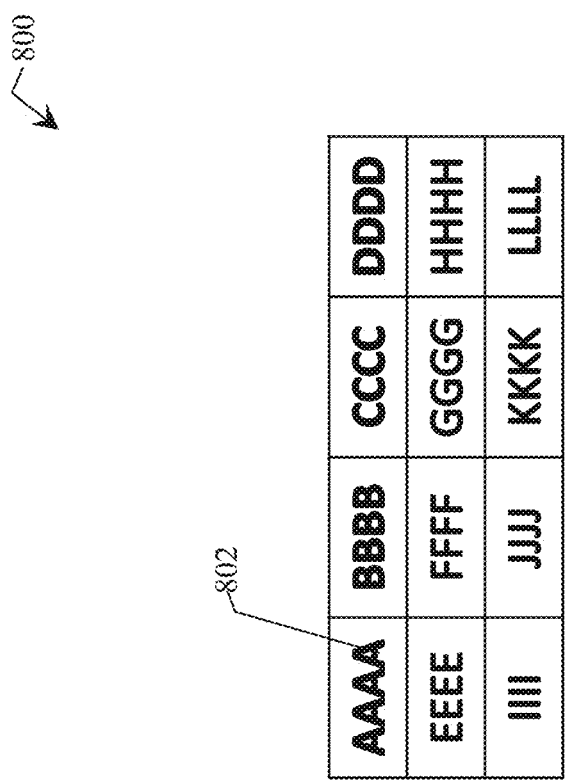
FIG. 8 is an array 800 of confidence scores 802, in accordance with some embodiments.

FIG. 8 is an array 800 of confidence scores 802, in accordance with some embodiments.

Each quadruple letter is used to represent a confidence score 802 corresponding to a vertex 702. Each confidence score 802 indicates a confidence level that the corresponding vertex 702 in the 3-D mesh 700 is accurate. Note that the quadruple letter simply indicates that a confidence score is being provided at each different position in the array 800. In some embodiments, the confidence score 802 is represented by a number. Note also that the array 800 has been simplified for the purposes of clarity and explanation.

The array 800 of confidence scores 802 is based on the array 600 of confidence scores 602. Each confidence score 802 in the array 800 of confidence scores 802 indicates a confidence that a corresponding vertex 702 is accurate. By recomputing the confidence scores 802, one can identify regions of the 3D mesh 700 with inaccurate depth estimation values so that additional algorithms are applied to improve the 3D mesh 700.

In some embodiments, one of the factors contributing to each of the confidence scores 802 is the magnitude of the depth distance ($D_d$) at the vertex 702. Thus, in some embodiments, the confidence score 802 is calculated with reference to the depth distance ($D_d$) at the vertex 702. The greater the magnitude of the depth distance ($D_d$) the lower the confidence score 802. In some embodiments, the depth distance ($D_d$) is limited by a truncation distance $T_d$. In some depth map estimation approaches (e.g., neural network based algorithms and lidar sensors) the depth accuracy tends to decrease with greater depth. In some embodiments, if a user device is scanning a wall is measured as having a depth distance $D_d$ of 8-feet away, the depth estimation $D_d$ is poor. Accordingly, a truncation distance $T_d$ of 6 feet is selected to filter out any depth distances that are measured greater than 6 feet.

In some embodiments, the confidence score 802 is based on the depth consistency ($D_c$) to a previous 3-D mesh in time. In other words, the 3D mesh 700 is compared to a previous 3-D mesh in time. For visible regions in the current and previous 3-D mesh, depth consistency ($D_c$) is calculated when there is not much difference between a pixel's current depth distance ($D_d$) and a previous depth distance in time.

In some embodiments, the confidence score 802 is based on a color variation score $T_v$. In some embodiments, the color variation score $T_v$ denotes how many vertices 702 in the 3-D mesh 700 have the same color. In some embodiments, the color variation score $T_v$ is aimed at identifying low confidence values for untextured regions.

In some embodiments, the confidence score 802 is based on the depth distance ($D_d$), the depth consistency ($D_c$), and the color variation score $T_v$. In some embodiments:

$$\text{confidence score} = (1-(D_d/T_d))*D_c*T_v$$

In some embodiments, confidence scores 802 for weakly scanned areas have low confidence values. This differentiation in the volume will provide flexibility to noisy surface improvement algorithms and planar smoothing algorithms, which can further improve the overall surface quality. In some embodiments, when at least one region of the 3-D mesh includes low confidence regions, processing cleanup algorithms are applied to clean up the regions. The algorithms result in higher confidence scores 802 after the algorithm is applied to the 3-D mesh 700. In some embodiments, the confidence scores 802 are generated based on the confidence scores 602.

Figure 9A:
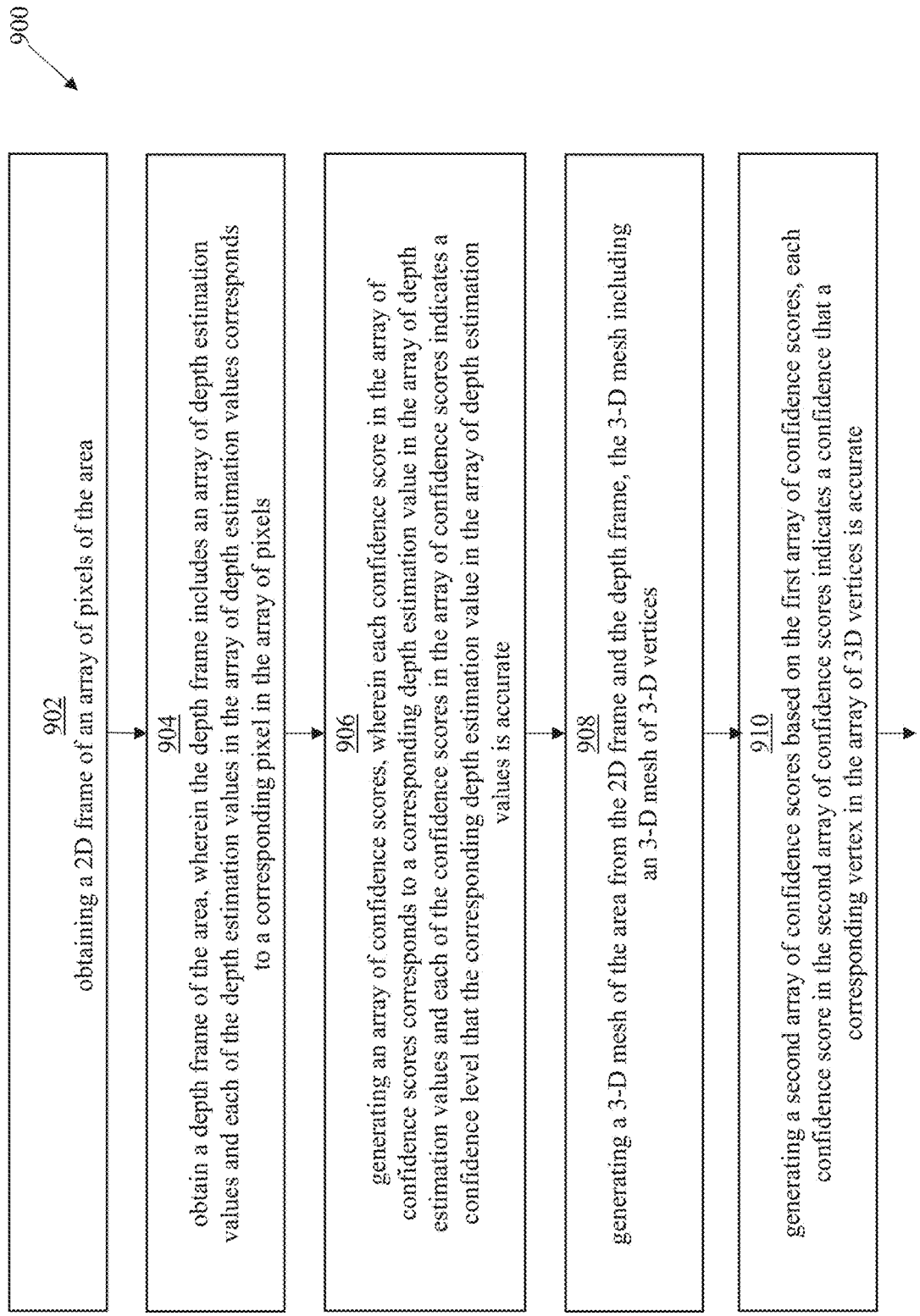
FIG. 9A-FIG. 9B are a flowchart 900 of an example method of obtaining a 3D representation of an area, in accordance with some embodiments.
Figure 9B:
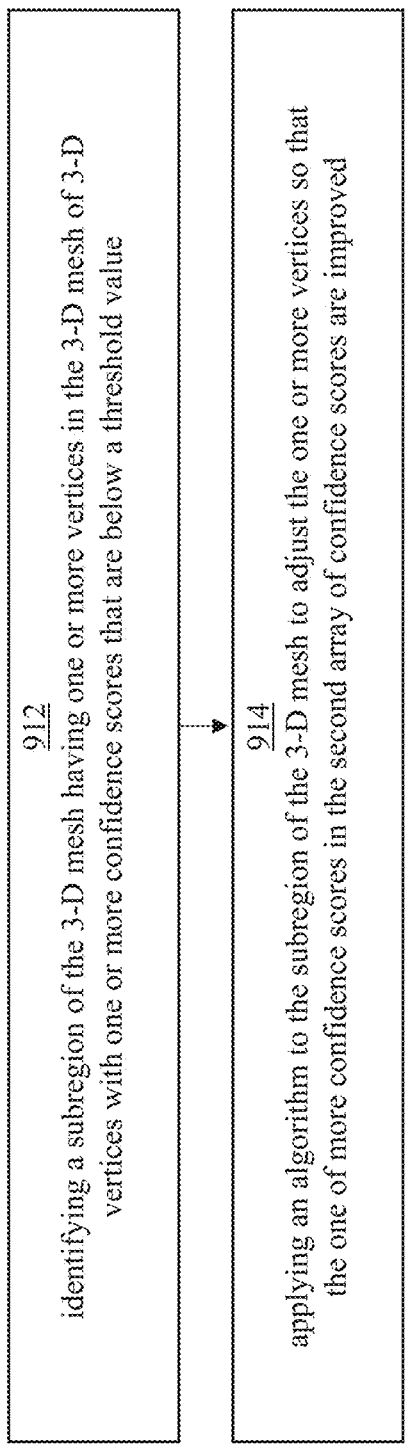

FIG. 9A-FIG. 9B are a flowchart 900 of an example method of obtaining a 3D representation of an area, in accordance with some embodiments.

An example of the area is the area 200 shown in FIG. 2, in accordance with some embodiments. Flowchart 900 includes blocks 902-914. Flow begins at block 902. The blocks may be performed in order, or out of order, depending upon the needs of a given embodiment. Furthermore, in some embodiments, blocks may be omitted and/or additional blocks may be added.

At block 902, a 2D frame of an array of pixels of the area is obtained. An example of the 2D frame is shown as the 2D frame 300 in FIG. 3, in accordance with some embodiments. Flow then proceeds to block 904.

At block 904, a depth frame of the area is obtained, such as by scanning the area with a depth sensitive device. The depth frame includes an array of depth estimation values and each of the depth estimation values in the array of depth estimation values corresponds to a corresponding pixel in the array of pixels. An example of the depth frame is shown as the depth frame 500 in FIG. 5. Flow then proceeds to block 906.

At block 906, an array of confidence scores is generated. Each confidence score in the array of confidence scores corresponds to a corresponding depth estimation value in the array of depth estimation values. Furthermore, each of the confidence scores in the array of confidence scores indicates a confidence level that the corresponding depth estimation value in the array of depth estimation values is accurate. An example of the array of confidence scores is the array 600 of confidence scores 602 shown in FIG. 6. Flow then proceeds to block 908.

At block 908, a 3-D mesh of the area is generated from the 2D frame and the depth frame, the 3-D mesh including a 3-D mesh of 3-D vertices. An example of the 3D mesh is the visual representation of the 3D-mesh 700 shown in FIG. 7. Flow then proceeds to block 910.

At block 910, a second array of confidence scores is generated based on the first array of confidence scores, each confidence score in the second array of confidence scores indicates a confidence that a corresponding vertex in the array of 3D vertices is accurate. An example of the array of confidence scores is the array 800 of confidence scores 802 shown in FIG. 8. Flow then proceeds to block 912 (FIG. 9B).

At block 912, a subregion of the 3-D mesh is identified having one or more vertices in the 3-D mesh of 3-D vertices with one or more confidence scores that are below a threshold value. Flow then proceeds to block 914.

At block 914, an algorithm is applied to the subregion of the 3-D mesh to adjust the one or more vertices so that the one of more confidence scores in the second array of confidence scores are improved.

Figure 10:
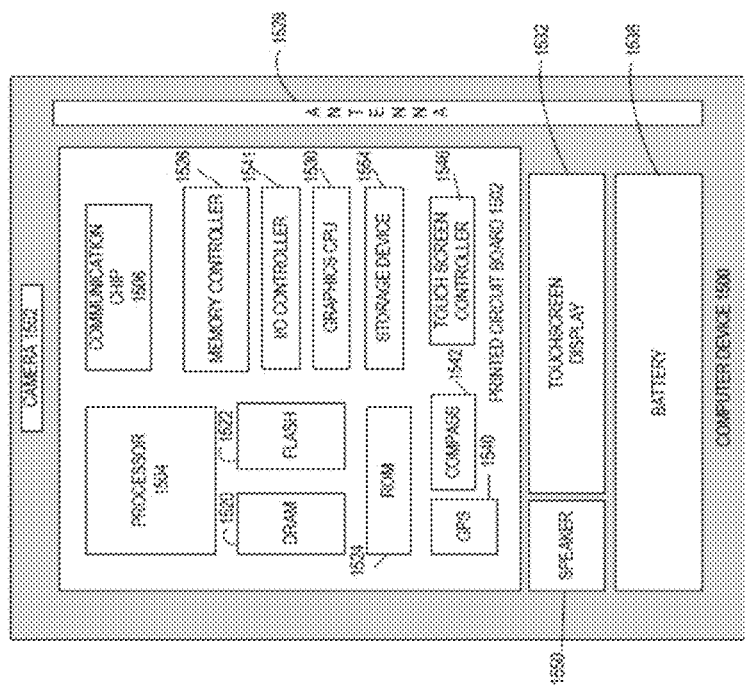
FIG. 10 illustrates an example computer device 1500 that may be employed by the apparatuses and/or methods described herein, in accordance with various embodiments.

FIG. 10 illustrates an example computer device 1500 that may be employed by the apparatuses and/or methods described herein, in accordance with various embodiments.

Computer device 1500 may generate the data 300-800 discussed in FIG. 3-FIG. 8 and implement blocks 902-914 in FIG. 9A-9B. 5. As shown, computer device 1500 may include a number of components, such as one or more processor(s) 1504 (one shown) and at least one communication chip 1506. In various embodiments, the one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions to enable computer device 1500, in response to execution of the programming instructions by one or more processor(s) 1504, to practice all or selected aspects of the system 100, and/or process flow 400, described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 11:
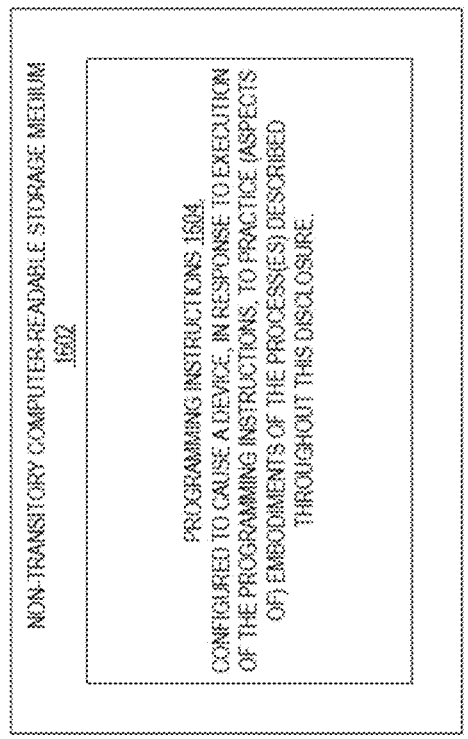

FIG. 11 illustrates an example computer-readable non-transitory storage medium that may be suitable for use to store instructions that cause an apparatus, in response to execution of the instructions by the apparatus, to practice selected aspects of the present disclosure, in accordance with some embodiments.

As shown, non-transitory computer-readable storage medium 1602 may include a number of programming instructions 1604. Programming instructions 1604 may be to enable a device, e.g., computer device 1500, in response to execution of the programming instructions, to implement and process flow 900. In alternate embodiments, programming instructions 1604 may be disposed on multiple computer-readable non-transitory computer readable storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method of obtaining a three dimensional (3D) representation of an area, comprising:
    obtaining a two dimensional (2D) frame of an array of pixels of the area;
    obtain a depth frame of the area, wherein:
        the depth frame includes an array of depth estimation values;
        each of the depth estimation values in the array of depth estimation values corresponds to one or more corresponding pixels in the array of pixels;
    generating an array of confidence scores based on a depth consistency between consecutive depth frames and a color variation in untextured regions, wherein:
        each confidence score in the array of confidence scores corresponds to one or more corresponding depth estimation values in the array of depth estimation values; and
        each of the confidence scores in the array of confidence scores indicates a confidence level that the one or more corresponding depth estimation value-values in the array of depth estimation values is accurate.

2. The method of claim 1, further comprising:
    generating a 3-D mesh of the area from the 2D frame and the depth frame, the 3-D mesh including a 3-D mesh of 3-D vertices and the array of confidence scores being a first array of confidence scores;
    generating a second array of confidence scores based on the first array of confidence scores, each confidence score in the second array of confidence scores indicates a confidence that a corresponding vertex in the array of 3D vertices is accurate.

3. The method of claim 2, further comprising:
    identifying a subregion of the 3-D mesh having one or more vertices in the 3-D mesh of 3-D vertices with one or more confidence scores that are below a threshold value;
    applying an algorithm to the subregion of the 3-D mesh to adjust the one or more vertices so that the one or more confidence scores in the second array of confidence scores are improved.

4. The method of claim 3, wherein the algorithm is a noisy surface improvement algorithm or a planar smoothing algorithm.

5. The method of claim 1, wherein each of the confidence scores in the array of confidence scores indicates a value that is inversely proportional to a depth estimation value in the array of depth estimation values.

6. The method of claim 1, wherein each of the confidence scores in the array of confidence scores indicates a value that is based on depth consistency.

7. The method of claim 1, wherein each of the confidence scores in the array of confidence scores indicates a value that is based on color variation.

8. A computer device for obtaining a three dimensional (3D) representation of an area, comprising:
a non-transitory computer readable medium configured to store computer executable instructions;
at least one processor, wherein, when the at least one processor executes the computer executable instructions, the processor is configured to:
obtain a two dimensional (2D) frame of an array of pixels of the area;
obtain a depth frame of the area, wherein:
the depth frame includes an array of depth estimation values;
each of the depth estimation values in the array of depth estimation values corresponds to one or more corresponding pixels in the array of pixels
generate an array of confidence scores based on a depth consistency between consecutive depth frames and a color variation in untextured regions, wherein:
each confidence score in the array of confidence scores corresponds to one or more corresponding depth estimation values in the array of depth estimation values; and
each of the confidence scores in the array of confidence scores indicates a confidence level that the one or more corresponding depth estimation values in the array of depth estimation values is accurate.

9. The computer device of claim 8, wherein the computer executable instructions further cause the at least one processor to:
generate a 3-D mesh of the area from the 2D frame and the depth frame, the 3-D mesh including an 3-D mesh of 3-D vertices and the array of confidence scores being a first array of confidence scores;
generate a second array of confidence scores based on the first array of confidence scores, each confidence score in the second array of confidence scores indicates a confidence that a corresponding vertex in the 3-D mesh of 3D vertices is accurate.

10. The computer device of claim 9, wherein the computer executable instructions further cause the at least one processor to:
identify a subregion of the 3-D mesh having one or more vertices in the 3-D mesh of 3-D vertices with one or more confidence scores that are below a threshold value;
apply an algorithm to the subregion of the 3-D mesh to adjust the one or more vertices so that the one or more confidence scores in the second array of confidence scores are improved.

11. The computer device of claim 10, wherein the algorithm is a noisy surface improvement algorithm or a planar smoothing algorithm.

12. The computer device of claim 8, wherein each of the confidence scores in the array of confidence scores indicates a value that is inversely proportional to a depth estimation value in the array of depth estimation values.

13. The computer device of claim 8, wherein each of the confidence scores in the array of confidence scores indicates a value that is based on depth consistency.

14. The computer device of claim 8, wherein each of the confidence scores in the array of confidence scores indicates a value that is based on color variation.

15. A non-transitory computer readable medium that stores computer executable instruction for obtaining a three dimensional (3D) representation of an area, wherein, when the computer executable instructions are executed by at least one processor, the at least one processor is configured to:
obtain a two dimensional (2D) frame of an array of pixels of the area;
obtain a depth frame of the area, wherein:
the depth frame includes an array of depth estimation values;
each of the depth estimation values in the array of depth estimation values corresponds to one or more corresponding pixels in the array of pixels
generate an array of confidence scores based on a depth consistency between consecutive depth frames and a color variation in untextured regions, wherein:
each confidence score in the array of confidence scores corresponds to one or more corresponding depth estimation values in the array of depth estimation values; and
each of the confidence scores in the array of confidence scores indicates a confidence level that the one or more corresponding depth estimation values in the array of depth estimation values is accurate.

16. The non-transitory computer readable medium of claim 15, wherein the computer executable instructions further cause the at least one processor to:
generate a 3-D mesh of the area from the 2D frame and the depth frame, the 3-D mesh including a 3-D mesh of 3-D vertices and the array of confidence scores being a first array of confidence scores;
generate a second array of confidence scores based on the first array of confidence scores, each confidence score in the second array of confidence scores indicates a confidence that a corresponding vertex in the array of 3D vertices is accurate.

17. The non-transitory computer readable medium of claim 16, wherein the computer executable instructions further cause the at least one processor to:
identify a subregion of the 3-D mesh having one or more vertices in the 3-D mesh of 3-D vertices with one or more confidence scores that are below a threshold value;
apply an algorithm to the subregion of the 3-D mesh to adjust the one or more vertices so that the one or more confidence scores in the second array of confidence scores are improved.

18. The non-transitory computer readable medium of claim 15, wherein each of the confidence scores in the array of confidence scores indicates a value that is inversely proportional to a depth estimation value in the array of depth estimation values.

19. The non-transitory computer readable medium of claim 15, wherein each of the confidence scores in the array of confidence scores indicates a value that is based on depth consistency.

20. The non-transitory computer readable medium of claim 15, wherein each of the confidence scores in the array of confidence scores indicates a value that is based on color variation.

* * * * *